No. 868,625. PATENTED OCT. 15, 1907.
A. BOOS.
CHECKING, REGISTERING, AND RECORDING MECHANISM.
APPLICATION FILED FEB. 17, 1904.
3 SHEETS—SHEET 1.
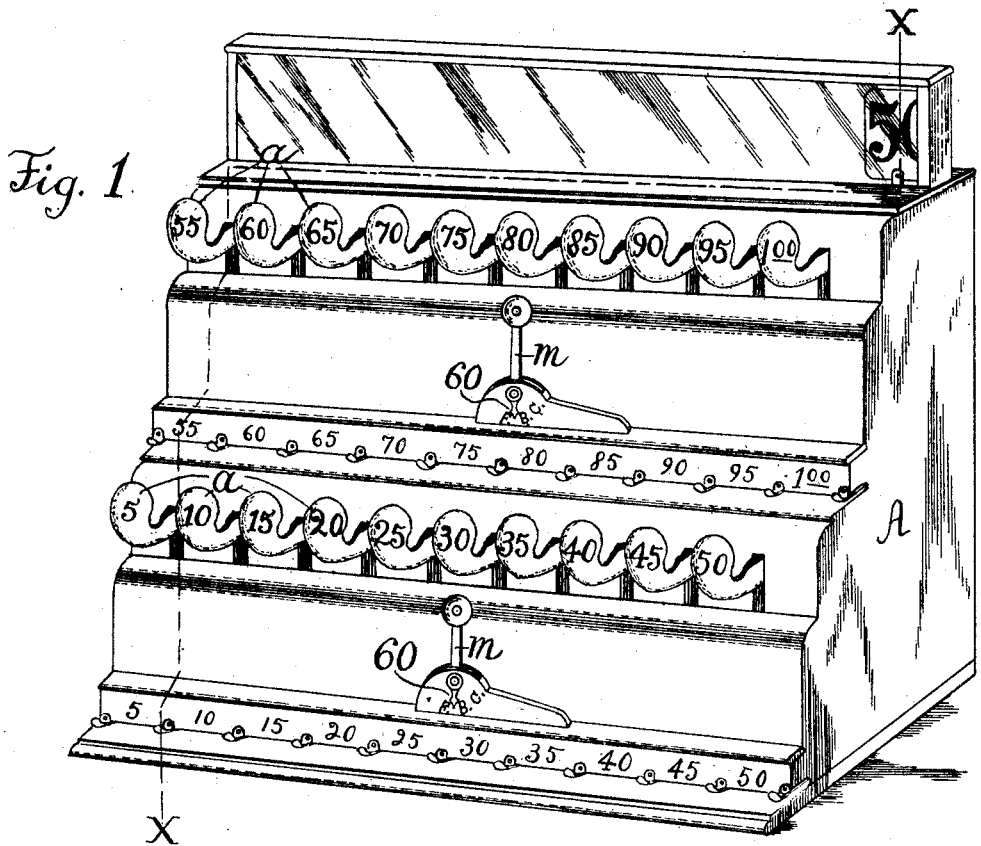

No. 868,625. PATENTED OCT. 15, 1907.
A. BOOS.
CHECKING, REGISTERING, AND RECORDING MECHANISM.
APPLICATION FILED FEB. 17, 1904.
3 SHEETS—SHEET 2.
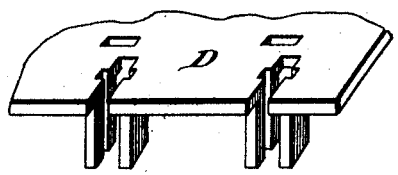
Fig. 3.
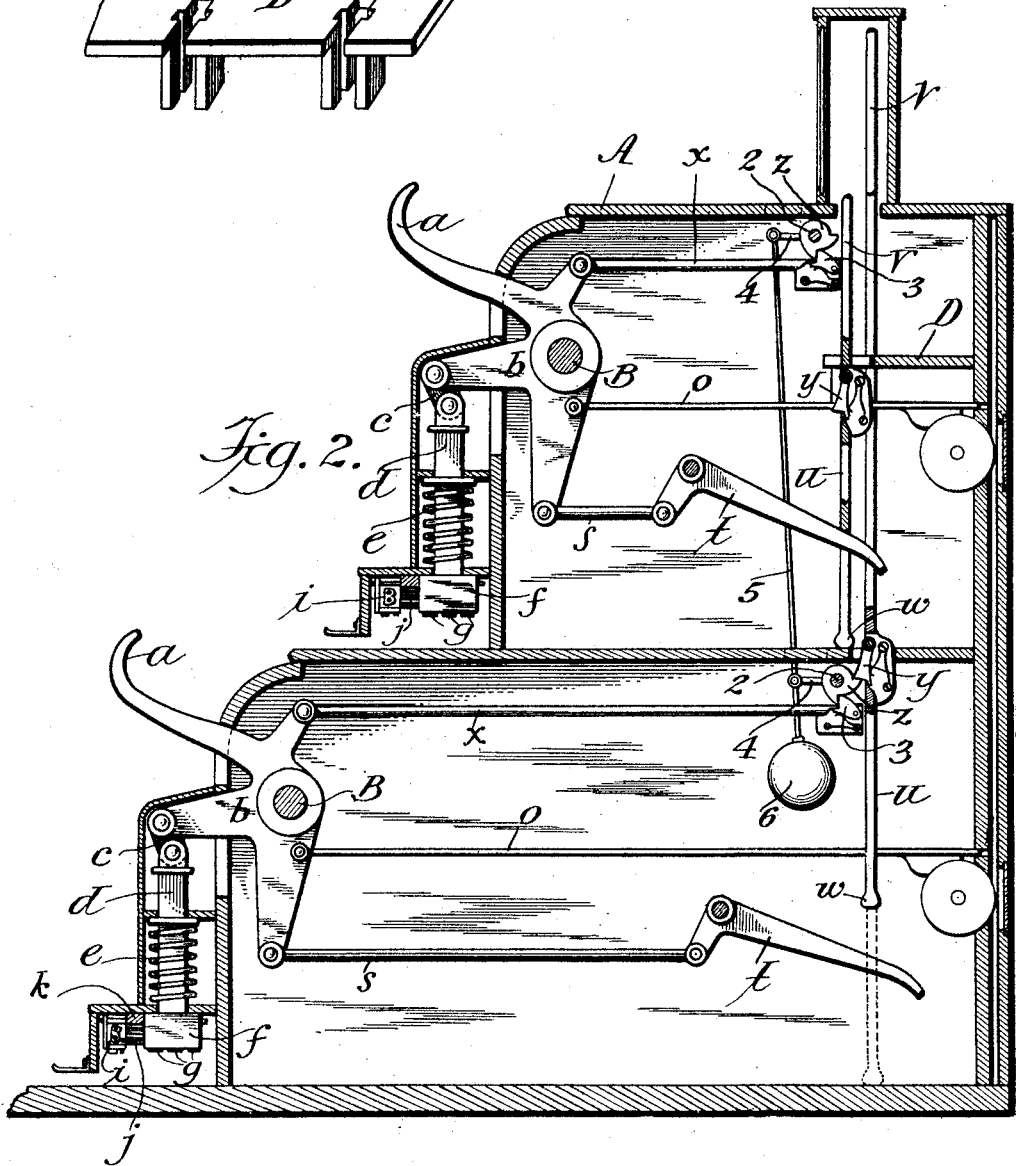

No. 868,625. PATENTED OCT. 15, 1907.
A. BOOS.
CHECKING, REGISTERING, AND RECORDING MECHANISM.
APPLICATION FILED FEB. 17, 1904.

3 SHEETS—SHEET 3.

UNITED STATES PATENT OFFICE.

AUGUST BOOS, OF NEW YORK, N. Y., ASSIGNOR, BY MESNE ASSIGNMENTS, OF ONE-TENTH TO ERNEST LUTZER, OF NEW YORK, N. Y.

CHECKING, REGISTERING, AND RECORDING MECHANISM.

No. 868,625.      Specification of Letters Patent.      Patented Oct. 15, 1907.

Application filed February 17, 1904. Serial No. 194,030.

*To all whom it may concern:*

Be it known that I, AUGUST BOOS, a subject of the Emperor of Germany, and a resident of the borough of Manhattan, in the county of New York and State of New York, have invented a new and useful Improvement in Checking, Registering, and Recording Mechanism, of which the following is a specification.

My invention relates to mechanism for registering payments respectively due on sales, and is designed particularly for use in restaurants and other establishments where refreshments are served or dispensed.

It embodies a recording mechanism for printing records, including the amount of each sale, upon individual slips or checks of paper, a registering device which may be arranged to indicate either the consecutive number of sales or the aggregate amount of the several sales consecutively, and a checking device by which the amount of each sale is temporarily exhibited upon a sign as a check upon the recording mechanism.

A system which is now in common operation, and by which each guest or customer receives a check on which is written or printed the prices of articles which he or she has purchased, is so generally understood that I do not deem it necessary to explain it in detail. My invention relates more particularly to mechanisms which are used in the operative plan before mentioned, and its objects are to provide simpler, more reliable and more effective mechanisms for the purposes referred to, and for impressing comprehensive data upon the checks; the latter, when impressed, having a form which is shown in a general way in the drawings which form a part of this application.

Figure 6:
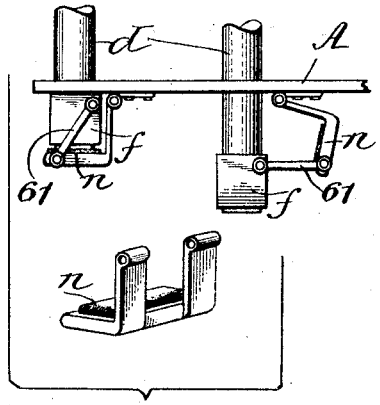
Figure 7:
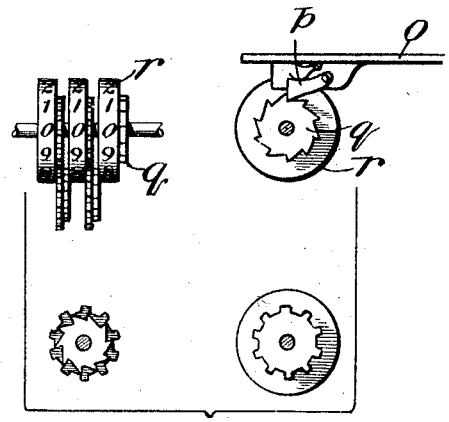
Figure 8:
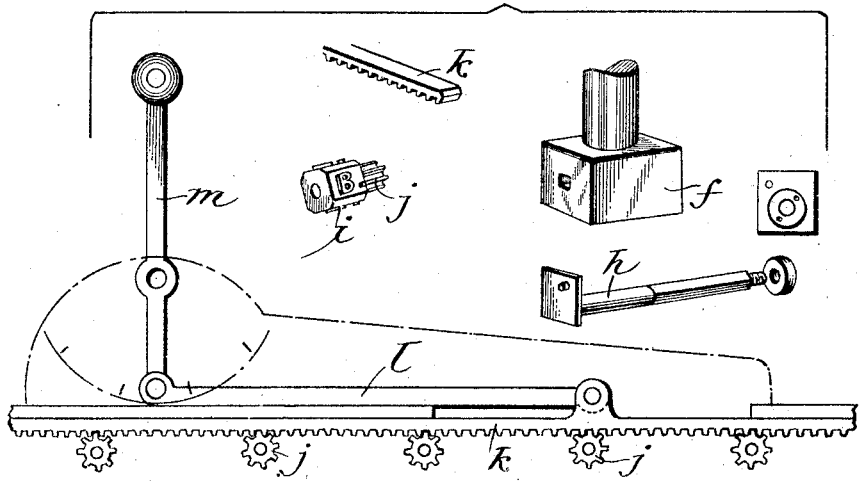

In the drawing, Figure 1 is a perspective elevation of the complete device. Fig. 2 is a vertical transverse section through the line X—X Fig. 1, a part of the case being omitted; Fig. 3 is a perspective view of a part of the guide D; Fig. 4 is a top plan view of an impressed check; Fig. 5 is a top plan view of a blank check; Fig. 6 illustrates details of the stamp-inking mechanisms; Fig. 7 illustrates details of registering mechanisms, and Fig. 8 illustrates details of rotary stamp adjusting mechanisms.

Reference characters are relatively alike throughout the drawings.

The several sales-recording and impressing mechanisms may be arranged in groups and tiers, as shown herein: a number of said mechanisms being arranged in each group and tier. I shall at first describe, more particularly, one train of said mechanism only; as the trains are all practically similar in construction.

Projecting outwardly from a case A, are handles or key-levers $a$, $a$, which may respectively be integral with first angle-levers $b$, $b$, which are fulcrumed on rods B, B, which are fixed within and longitudinally of the case A. To an arm of each first angle-lever $b$, is pivotally attached a link $c$, which is also pivotally attached to an end of a plunger $d$, which is reciprocatively mounted in bearings which are secured to the case A. Resilient means are provided for urging each angle-lever $b$, and the mechanism connected thereto, to their respective prime positions; said means, as shown, comprising a helical spring $e$, which is suitably arranged to urge the plunger $d$, upwardly, for the purpose mentioned. At the lower end of the plunger $d$, is fixed a stamping mechanism which is combined with an inking device; all of which may be described as follows: On the face of a stamp-body $f$, which is directly attached to the plunger $d$, are formed one or more numeral-stamps $g$, $g$. On a stud $h$, which is fixed in the stamp-body $f$, is mounted a rotatable stamp $i$, which has a plurality of character faces, on which are formed stamps which comprise suitable characters. A spur-pinion $j$, is attached to each rotatable stamp $i$, and is meshable with a reciprocatable toothed rack $k$, which is mounted within and longitudinally of the case A. To the rack $k$, is pivotally attached a link $l$, which connects the rack to a manually-operatable lever $m$, which is pivotally mounted on the case A, and has a handle by which it may be oscillated; and the degree of oscillation may be shown by a pointer 60, which is attached to the lever $m$, and by an indicating dial, which is arranged concentrically of the pointer 60, and which comprises suitable characters which may be delineated upon the case A; said characters being similar to, and arranged in relatively the same sequence, as those on the rotatable stamp $i$. An inking pad $n$, is pivotally mounted on the case A, and is connected at one end by a link 61, to the stamp-body $f$. The case A, is suitably slotted to permit a check which is shown in Figs. 4 and 5 of the drawing and herein referred to as C, to be so positioned beneath any one of the stamping mechanisms that it may be stamped by the latter.

To each of the angle-levers $b$, is also pivotally attached one end of a link $o$, upon the other end of which is pivotally mounted a spring-pressed pawl $p$, which is engageable with a ten-toothed ratchet-wheel $q$, which is fixed upon, and serves to rotate, the prime wheel of a counting register $r$, which may be of any suitable construction that may be operated by means of the ratchet-wheel $q$; a separate register being operatable by each first angle-lever $b$. To an arm of each of the first angle-levers $b$, is also pivotally attached one end of a link $s$, and the other end of said link is pivotally attached to a second angle-lever $t$, which is pivotally mounted within the case A. An arm of each second angle-lever $t$, is engageable in the bifurcation of a particular rod $u$, and is operatable to raise the latter and with it a sign $v$, which is attached to the upper end thereof, and which bears on a face thereof, a numeral which corresponds with the number which is formed upon the numeral-stamp $g$, on the stamp-body $f$. The bifurcated parts of the rod $u$, are flared at their lower or outer ends, on which are fixed weights $w$.

Pivotally mounted in a slot in each rod $u$, is a first spring-pressed pawl $y$, which, if the rod $u$, be raised, engages with a tooth of an oscillatable two-toothed detent $z$, which is fixed upon a rod 2, which is journaled longitudinally of the case A; and the detent $z$, serves to engage any one of the first spring-pressed pawls of a group, and to thus retain any one of a plurality of rods $u$, and signs $v$, in their raised positions, as will be hereinafter related; the detent $z$, being itself retained in position by reason of the engagement of the other tooth thereof with one of a group of second spring-pressed pawls 3, which are pivotally mounted within the case A, and each one of which may be reciprocated by means of a link $x$, which is attached to the first angle-lever $b$. Each detent $z$, is therefore engageable by any one of the pawls $y$, or 3, which are on the same tier with the levers $b$, by means of which said pawls may be operated; that is to say, should the devices, as thus far described, be arranged in tiers as shown in the drawing. To each rod 2, is attached a lever 4, and all of said levers 4, are pivotally attached to a link 5, which is provided, at its lower end, with a weight 6. A perforated guide D, is fixed within the case A, and serves to guide the rods $u$, and also serves as a rest for the signs $v$, which are not exposed to view. The guide D, is suitably recessed near one edge thereof to permit of the passage therethrough of the particular pawl $y$, which is mounted in the foremost rod $u$. The rods $u$, may also be guided in slots in the horizontal partitions E, which divide the case A, horizontally.

The mechanism thus described may be operated as follows:—a check C, being first provided, upon which there may have been printed a suitable form in which spaces may have been left blank for the purpose of receiving stamped impressions from the stamps hereinbefore referred to: At any time before a check is stamped a lever $m$, may be oscillated, and by means thereof and of the link $l$, the rack $k$, may be reciprocated, and thereby the spur-pinions $j$, $j$, together with stamps $i$, $i$, to which they are attached, may be rotated in order to bring into operative position the particular faces of stamps $i$, which may be required to impress a particular character upon a check C. The characters which may thus be impressed may correspond with one of those which are shown by the dial on the case A, as before mentioned, and may preferably be an initial letter of a term which may be definitive of a class of articles which are sold or dispensed. Thus, for instance, said articles may be classed under the several heads of "Food", "Bar" and "Cigars"; which may be respectively indicated by the letters "F", "B", and "C". On each stamp $i$, a blank face may be left and on the case A, a blank space may also be left in the dial, so that when the pointer $m'$, is moved to the latter, no impression will be made by the former: thus providing for the insertion, in manuscript, on the check C, of any other desired letter or symbol. The operation of the first angle-lever $b$, and the consequent depression of the stamp-body $f$, and stamp $i$, cause the inking-pad $n$, to be swung downwardly and to one side of the faces of the numeral-stamp $g$, and of the stamp $i$, to which position the inking-pad $n$, will be moved by means of the link 61; the latter also serving to retain the inking-pad in the position thus described. A check C, having been properly positioned to receive impressions from a numeral-stamp $g$, and from a rotatable stamp $i$, a handle $a$, (upon which, as shown, may be delineated a number which shall correspond with the particular number which it may be desired to impress by the numeral-stamp $g$, upon the check C,) may then be depressed, and by means thereof and of a first angle-lever $b$, one plunger $d$, one stamp-body $f$, and one stamp $i$, will also be depressed: thus causing the impression of a stamp $i$, and of a numeral-stamp $g$, to be made upon the check C. The depression of a handle $a$, and consequent oscillation of a first angle-lever $b$, also, by means of a link $s$, causes a second angle-lever $t$, to pass between and be guided by the flared ends of the particular rod $u$, which may form a part of the train of mechanism which is being operated, and the lever $t$, further guided by the bifurcated part of the rod $u$, engages and raises the latter and the particular sign $v$, which is fixed thereon: thus placing the latter in a visible position. Simultaneously therewith, the link $x$, is operated by means of a first angle-lever $b$, and, by means of the second spring-pressed pawl 3, which is pivotally attached to the link $x$, oscillates the detent $z$; all of the detents $z$, which are in the several trains of mechanism, being simultaneously oscillated by reason of their connection by means of the arms 4, 4, and link 5, with the primarily operated detent $z$. The detents $z$, being thus oscillated, release any first pawl $y$, which has been engaged previously by the detents, and all of the pawls $y$, except that one which has been raised by the operation thus far described, will, immediately after the operation before referred to, with the rods $u$, to which they are attached and the signs $v$, which are attached to said rods, either remain at or assume, (as the case may be,) their prime or lowest positions: thus leaving but one sign $v$, in a position where the numeral thereon will be visible. The operation of the first angle-lever $b$, also serves to move a link $o$, and also a pawl $p$, which is mounted thereon, in an operative direction, relatively of its particular ratchet-wheel $q$, and of the tooth thereof, with which the pawl $p$, has previously engaged, and to a position where the pawl $p$, will be urged by its spring into engagement with the next tooth of said ratchet-wheel. If the handle $a$, be now released, the spring $c$, will urge the plunger $d$, upwardly, and by means thereof will raise the stamp-body $f$, and stamp $i$, and by means of the link 61, will cause the inking-pad $n$, to assume its prime position and to thus ink the faces of the numeral-stamp $g$, and of the stamp $i$. The spur-pinion $j$, which has been unmeshed from the rack $k$, will be thus made to again mesh with the latter; by means of the link $c$, the handle $a$, first angle-lever $b$, links $o$, and $x$, and second angle-lever $t$, and pawls $p$, and $q$, will also be returned to their respective prime positions; the rod $u$, which has been raised, as before related, will have so positioned its connected first spring-pressed pawl $y$, that the latter will engage a particular detent $z$, and said rod $u$, with its attached sign $v$, will thus be retained in its raised position;

and the previously-operated link $o$, will have urged its connected spring-pressed pawl $p$, in a direction operatively of the ratchet-wheel $q$, which will thus be rotated to the extent of one-tenth of a revolution and will thus cause its connected register wheel to show an adjacent and higher number; the additional amount thus registered being equal to that which has been impressed by the numeral-stamp $g$. It should be stated that upon the return of the pawl 3, to its prime position, the weight 6, will, by means of a link 5, and levers 4, urge all of the detents $z$, to their respective prime positions, in which the several first pawls $y$, are engageable with the former; and the weights $w$, which are attached to any previously-raised rods $u$, will gravitationally effect the replacement of said rods $u$, in their prime positions. Thus, it will be noted, the operation of a handle $a$, effects the emplacement in a visible position of a sign $v$, and the replacement in its prime or invisible position of any previously-raised sign $v$; and it should also be noted that the several trains of mechanism which operate as thus described, so co-act, one with the other, that only one sign $v$, can be displayed at a time.

It will be readily understood that the mechanisms whose operation have thus far been described may be arranged parallely of each other and in tiers; and some of them in groups as shown in the drawing.

I claim as new and as my invention,

1. In a checking, registering and recording mechanism, the combination of a handle; a first angle-lever which is operatable by means of the first angle-lever; a numeral-stamp which is operatable by means of the stamp-body; a rotatable stamp which is mounted on the stamp-body and has a plurality of character faces; a spur-pinion which is attached to the rotatable stamp; a reciprocatable toothed-rack which is meshable with the spur-pinion; and manually-operatable reciprocating means connected to the toothed-rack.

2. In a checking, registering and recording mechanism, the combination of a handle; a first angle-lever which is operatable by means of the handle; a stamp-body which is operatable by means of the first angle-lever; a numeral-stamp which is operatable by means of the stamp-body; a rotatable stamp which is mounted on the stamp-body and has a plurality of character faces; a spur-pinion which is attached to the rotatable stamp; a reciprocatable toothed-rack which is meshable with the spur-pinion; manually-operatable reciprocating means connected to the toothed-rack; a pointer which is operatable by the manually-operatable means; and an indicating dial which is arranged concentrically of the pointer and comprises characters which are similar to and arranged in relatively the same sequence as those on the rotatable stamp.

3. In a checking, registering and recording mechanism, the combination of a handle; a first angle-lever which is operatable by means of the handle; a stamp-body which is operatable by means of the first angle-lever; a numeral-stamp which is operatable by means of the stamp-body; a rotatable stamp which is mounted on the stamp-body and has a plurality of character faces; a spur-pinion which is attached to the rotatable stamp; a reciprocatable toothed-rack which is meshable with the spur-pinion; manually-operatable reciprocating means connected to the toothed-rack; and an inking pad which is operatable by the stamp-body to ink the several stamps.

4. In a checking, registering and recording mechanism, the combination of a handle; a first angle-lever which is operatable by means of the handle; a stamp-body which is operatable by means of the first angle-lever; a numeral-stamp which is operatable by means of the stamp-body; a rotatable stamp which is mounted on the stamp-body and has a plurality of character faces; a spur-pinion which is attached to the rotatable stamp; a reciprocatable toothed-rack which is meshable with the spur-pinion; manually-operatable reciprocating means connected to the toothed-rack; and a counting-register which is connected to and is operatable by the first angle-lever and is so arranged that any additional amount registered at an operation thereof will be equal to that which is impressible by the numeral-stamp which is operated by the first angle-lever.

5. In a checking, registering and recording mechanism, the combination of a handle; a first angle-lever which is operatable by means of the handle; a stamp-body which is operatable by means of the first angle-lever; a numeral-stamp which is operatable by means of the stamp-body; a rotatable stamp which is mounted on the stamp-body and has a plurality of character faces; a spur-pinion which is attached to the rotatable stamp; a reciprocatable toothed-rack which is meshable with the spur-pinion; manually-operatable reciprocating means connected to the toothed-rack; a link which is pivotally attached at one end thereof to the first angle-lever and at the other end thereof to a second angle-lever; said second angle-lever which is engageable with a bifurcated rod and is operatable to raise said rod; said bifurcated rod; and a sign which is attached to the bifurcated rod and bears on the face thereof a numeral which corresponds with the numeral which is impressible by the numeral-stamp.

6. In a checking, registering and recording mechanism, the combination of a handle; a first angle-lever which is operatable by means of the handle; a stamp-body which is operatable by means of the first angle-lever; a numeral-stamp which is operatable by means of the stamp-body; a rotatable stamp which is mounted on the stamp-body and has a plurality of character faces; a spur-pinion which is attached to the rotatable stamp; a reciprocatable toothed-rack which is meshable with the spur-pinion; manually-operatable reciprocating means connected to the toothed-rack; a link which is pivotally attached at one end thereof to the first angle-lever and at the other end thereof to a second angle-lever; said second angle-lever which is engageable with a bifurcated rod and is operatable to raise said rod; said bifurcated rod; a sign which is attached to the bifurcated rod and bears on the face thereof a numeral which corresponds with the numeral which is impressible by the numeral-stamp; a first spring-pressed pawl which is mounted in the bifurcated rod and is engageable with an oscillatable detent; and said oscillatable detent which is so engageable by the first spring-pressed pawl as to retain a bifurcated rod and its connected sign in positions to which they may have been moved by the second angle-lever and in which the numeral on the sign is visible.

7. In a checking, registering and recording mechanism, the combination of a handle; a first angle-lever which is operatable by means of the handle; a stamp-body which is operatable by means of the first angle-lever; a numeral-stamp which is operatable by means of the stamp-body; a rotatable stamp which is mounted on the stamp-body and has a plurality of character faces; a spur-pinion which is attached to the rotatable stamp; a reciprocatable toothed-rack which is meshable with the spur-pinion; manually-operatable reciprocating means connected to the toothed rack; a link which is pivotally attached at one end thereof to the first angle-lever and at the other end thereof to a second angle-lever; said second angle-lever which is engageable with a bifurcated rod and is operatable to raise said rod; said bifurcated rod; a sign which is attached to the bifurcated rod and bears on the face thereof a numeral which corresponds with the numeral which is impressible by the numeral-stamp; a first spring-pressed pawl which is mounted in the bifurcated rod and is engageable with an oscillatable detent; said oscillatable detent which is so engageable by the first spring-pressed pawl as to retain a bifurcated rod and its connected sign in positions to which they may have been moved by the second angle-lever and in which the numeral on the sign is visible; a second spring-pressed pawl which is so engageable with the detent as to retain the latter in the position in which said detent retains the sign in the position in which the numeral on said sign is visible; and a link which connects the second spring-pressed pawl to the first angle-lever.

8. In a checking, registering and recording mechanism, the combination of a plurality of first angle-levers each of which is operatable by means of a handle; a plurality of links which respectively connect a first angle-lever to a second angle-lever; a plurality of said second angle-levers which are respectively engageable with and operatable to raise a bifurcated rod; a plurality of said bifurcated rods; a plurality of signs which are respectively attached to bifurcated rods and which bear on their respective faces numerals which correspond with the numerals which are impressible by the numeral-stamps; a plurality of first spring-pressed pawls which are respectively mounted in bifurcated rods and are respectively engageable with an oscillatable detent; an oscillatable detent which is so engageable by any one of a plurality of first spring-pressed pawls as to retain a bifurcated rod and a sign in positions to which they may have been moved by a second angle-lever in which the numeral on the sign is visible; a plurality of second spring-pressed pawls which are pivotally mounted and are respectively so engageable with a detent as to retain the latter in the position in which the detent retains a sign in the position in which the numeral on said sign is visible; a plurality of links which connect first spring-pressed pawls to first angle-levers; and a plurality of links which connect second spring-pressed pawls to first angle-levers.

9. In a checking, registering and recording mechanism, the combination of a plurality of first angle-levers each of which is operatable by means of a handle; a plurality of links which respectively connect a first angle-lever to a second angle-lever; a plurality of said second angle-levers which are respectively engageable with and operatable to raise a bifurcated rod; a plurality of said bifurcated rods; a plurality of signs which are respectively attached to bifurcated rods and which bear on their respective faces numerals which correspond with the numerals which are impressible by the numeral-stamps; a plurality of first spring-pressed pawls which are respectively mounted in bifurcated rods and are respectively engageable with an oscillatable detent; a plurality of groups of first spring-pressed pawls which are mounted in the bifurcated rods, each group being engageable with one of several oscillatable detents; a plurality of oscillatable detents which are respectively so engageable by any one of a plurality of first spring-pressed pawls as to retain bifurcated rods and signs in positions to which they may have been moved by a second angle-lever and in which the numeral on the sign is visible; a plurality of second spring-pressed pawls which are pivotally mounted and are respectively so engageable with a detent as to retain the latter in the position in which the detent retains the sign in the position in which the numeral on said sign is visible; a plurality of links which connect first spring-pressed pawls to first angle-levers; and a plurality of links which connect second spring-pressed pawls to first angle-levers.

10. In a checking, registering and recording mechanism, the combination of a plurality of first angle-levers each of which is operatable by means of a handle; a plurality of links which respectively connect a first angle-lever to a second angle-lever; a plurality of said second angle-levers which are respectively engageable with and operatable to raise a bifurcated rod; a plurality of said bifurcated rods; a plurality of signs which are respectively attached to bifurcated rods and which bear on their respective faces numerals which correspond with the numerals which are impressible by numeral-stamps; a plurality of first spring-pressed pawls which are respectively mounted in bifurcated rods and are respectively engageable with an oscillatable detent; an oscillatable detent which is so engageable by any one of a plurality of first spring-pressed pawls as to retain a bifurcated rod and a sign in positions to which they may have been moved by a second angle-lever in which the numeral on the sign is visible; a plurality of second spring-pressed pawls which are pivotally mounted and are respectively so engageable with a detent as to retain the latter in the position in which the detent retains a sign in the position in which the numeral on said sign is visible; a plurality of links which connect first spring-pressed pawls to first angle-levers; a plurality of links which connect second spring-pressed pawls to first angle-levers; and a plurality of counting registers which are respectively connected to and are operatable by the several first angle-levers.

11. In a checking, registering and recording mechanism, the combination of a plurality of first angle-levers each of which is operatable by means of a handle; a plurality of links which respectively connect a first angle-lever to a second angle-lever; a plurality of said second angle-levers which are respectively engageable with and operatable to raise a bifurcated rod; a plurality of said bifurcated rods; a plurality of signs which are respectively attached to bifurcated rods and which bear on their respective faces numerals which correspond with the numerals which are impressible by numeral-stamps; a plurality of first spring-pressed pawls which are respectively mounted in bifurcated rods and are respectively engageable with an oscillatable detent; a plurality of groups of first spring-pressed pawls which are mounted in the bifurcated rods, each group being engageable with one of several oscillatable detents; a plurality of oscillatable detents which are respectively so engageable by any one of a plurality of first spring-pressed pawls as to retain bifurcated rods and signs in positions to which they may have been moved by a second angle-lever and in which the numeral on the sign is visible; a plurality of second spring-pressed pawls which are pivotally mounted and are respectively so engageable with a detent as to retain the latter in the position in which the detent retains the sign in the position in which the numeral on said sign is visible; a plurality of links which connect first spring-pressed pawls to first angle-levers; a plurality of links which connect second spring-pressed pawls to first angle-levers; and a plurality of counting-registers which are respectively connected to and are operatable by the several first angle-levers.

12. In a checking, registering and recording mechanism, the combination of a handle; a first angle-lever which is operatable by means of the handle; a stamp-body which is operatable by means of the first angle-lever; a numeral-stamp which is operatable by means of the stamp-body; a rotatable stamp which is mounted on the stamp-body and has a plurality of character faces; a spur-pinion which is attached to the rotatable stamp; a reciprocatable toothed-rack which is meshable with the spur-pinion; manually-operatable reciprocating means connected to the toothed-rack; a second spring-pressed pawl which is so engageable with the detent as to retain the latter in the position in which said detent retains the sign in the position in which the numeral on said sign is visible; a link which connects the second spring-pressed pawl to the first angle-lever; and resilient means which are arranged to urge a first angle-lever and its connected mechanism to their respective prime positions.

13. In a checking, registering and recording mechanism, the combination of a plurality of first angle-levers each of which is operatable by means of a handle; a plurality of links which respectively connect a first angle-lever to a second angle-lever; a plurality of said second angle-levers which are respectively engageable with and operatable to raise a bifurcated rod; a plurality of said bifurcated rods; a plurality of signs which are respectively attached to bifurcated rods and which bear on their respective faces numerals which correspond with the numerals which are impressible by numeral-stamps; a plurality of first spring-pressed pawls which are respectively mounted in bifurcated rods and are respectively engageable with an oscillatable detent; an oscillatable detent which is so engageable by any one of a plurality of first spring-pressed pawls as to retain a bifurcated rod and a sign in positions to which they may have been moved by a second angle-lever in which the numeral on the sign is visible; a plurality of second spring-pressed pawls which are pivotally mounted and are respectively so engageable with a detent as to retain the latter in the position in which the detent retains a sign in the position in which the numeral on said sign is visible; a plurality of links which connect first spring-pressed pawls to first angle-levers; a plurality of links which connect second spring-pressed pawls to first angle-levers; and a plurality of resilient means which are arranged to urge the first angle-levers and their connected mechanisms to their respective prime positions.

14. In mechanism of the character described, the combination with a casing comprising a front containing a slot and a check bearing portion in juxtaposition to said slot, said casing having a numerical designation contiguous to said slot, a movable stamp head normally out of relation with said bearing portion and provided with a character corresponding with the numerical designation, a rotatable stamp on said stamp head and having a plurality of differing characters, means for rotating said stamp, and means for moving said stamp head and stamp into stamping relation.

15. In mechanism of the character described, the combination with a plurality of movable stamp heads, provided with numerical characters of different valuations respectively, a rotatable stamp on each head and having a plurality of differing characters, means for simultaneously rotating the rotatable stamps, and means for independently actuating each stamp head and rotatable stamp carried thereby.

16. In mechanism of the character described, the combination with indicating and registering means, of a movable stamp head normally out of stamping relation and provided with a numerical character, a rotatable stamp on said head and having a plurality of differing characters, means for rotating said head, and means for simultaneously actuating the stamp head and rotatable stamp, and likewise, the indicating and registering means.

17. In a checking, registering and recording mechanism, the combination of a plurality of rotatable stamps; a reciprocatable toothed-rack; a plurality of spur-pinions which are meshable with the toothed-rack and each of which is attached to a rotatable stamp; manually-operatable reciprocating means connected to the toothed-rack; a pointer which is operable by the manually-operatable means; and an indicating dial which is arranged concentrically of the pointer and comprises characters which are similar to and arranged in relatively the same sequence as those on the rotatable stamp.

18. In a checking, registering and recording mechanism, the combination of a plurality of reciprocatable stamp-bodies having suitable type or characters thereon, a rotatable stamp mounted on each of the stamp-bodies, each provided with suitable recording characters, means for simultaneously rotating the stamps to present any selected combination of characters thereon in impressing alinement with the characters on the stamp-bodies, and means for reciprocating the latter.

19. I a device of the character described, the combination of a plurality of recording mechanisms arranged in two tiers, each of said recording mechanisms having a plurality of recording characters, means for presenting a selected character on one of said mechanisms with a selected character on another of said mechanisms in position to print simultaneously, and means for actuating said mechanisms to effect a printed record.

In testimony whereof I have signed my name to this application in the presence of two subscribing witnesses.

AUGUST BOOS.

Witnesses:
 FREDA SCHULTZ,
 CHAS. H. DAVIDS.